United States Patent
Yamada et al.

(10) Patent No.: US 11,958,782 B2
(45) Date of Patent: Apr. 16, 2024

(54) CUBIC BORON NITRIDE SINTERED MATERIAL

(71) Applicant: SUMITOMO ELECTRIC HARDMETAL CORP., Hyogo (JP)

(72) Inventors: Kento Yamada, Hyogo (JP); Machiko Abe, Hyogo (JP); Hironari Moroguchi, Hyogo (JP); Akihiko Ueda, Hyogo (JP); Satoru Kukino, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 18/029,811

(22) PCT Filed: Mar. 8, 2022

(86) PCT No.: PCT/JP2022/010011
§ 371 (c)(1),
(2) Date: Mar. 31, 2023

(87) PCT Pub. No.: WO2023/170787
PCT Pub. Date: Apr. 19, 2023

(65) Prior Publication Data
US 2023/0286869 A1   Sep. 14, 2023

(51) Int. Cl.
*C04B 35/5831* (2006.01)

(52) U.S. Cl.
CPC .. *C04B 35/5831* (2013.01); *C04B 2235/3217* (2013.01); *C04B 2235/386* (2013.01);
(Continued)

(58) Field of Classification Search
CPC ........ C04B 35/5831; C04B 2235/3217; C04B 2235/386; C04B 2235/762;
(Continued)

(56) References Cited

U.S. PATENT DOCUMENTS

2013/0199351 A1\* 8/2013 Setoyama ............. C23C 28/044
156/60
2017/0197886 A1   7/2017 Danda et al.
(Continued)

FOREIGN PATENT DOCUMENTS

JP    49-109231 A    10/1974
JP    2013-255986 A    12/2013
(Continued)

OTHER PUBLICATIONS

Written Opinion for corresponding Application No. PCT/JP2022/010011, dated May 10, 2022.
(Continued)

*Primary Examiner* — Shuangyi Abu Ali
(74) *Attorney, Agent, or Firm* — Renner, Otto, Boisselle & Sklar, LLP (57) ABSTRACT

A cubic boron nitride sintered material comprising cubic boron nitride grains, a binder phase, and a void, in which a percentage of the cubic boron nitride grains based on the total of the cubic boron nitride grains and the binder phase is 40 vol % to 70 vol %, a percentage of the binder phase based on the total of the cubic boron nitride grains and the binder phase is 30 vol % to 60 vol %, the binder phase includes 10 vol % to 100 vol % of aluminum oxide grains, an average grain size of the aluminum oxide grains is 50 to 250 nm, the cubic boron nitride sintered material comprises 0.001 vol % to 0.100 vol % of one or more first voids, and at least one portion of each of the first voids is in contact with the aluminum oxide grains.

5 Claims, 1 Drawing Sheet

(52) U.S. Cl.
CPC .. *C04B 2235/762* (2013.01); *C04B 2235/781* (2013.01); *C04B 2235/785* (2013.01)

(58) Field of Classification Search
CPC ........ C04B 2235/781; C04B 2235/785; C04B 2235/3244; C04B 2235/3813; C04B 2235/3839; C04B 2235/3843; C04B 2235/3847; C04B 2235/3865; C04B 2235/3873; C04B 2235/3886; C04B 2235/402; C04B 2235/405; C04B 2235/5436; C04B 2235/5445; C04B 2235/5472; C04B 2235/6567; C04B 2235/77; C04B 2235/78; C04B 2235/80; C04B 35/6261; C04B 35/62635; C04B 35/63; C04B 35/645; C22C 26/00
See application file for complete search history.

(56) References Cited

U.S. PATENT DOCUMENTS

| | | | |
|---|---|---|---|
| 2017/0369314 A1* | 12/2017 | Zhang | C04B 37/021 |
| 2018/0117678 A1* | 5/2018 | Takahama | C04B 41/5063 |
| 2019/0344350 A1* | 11/2019 | Zunega | C23F 1/28 |

FOREIGN PATENT DOCUMENTS

| | | |
|---|---|---|
| JP | 2016-107396 A | 6/2016 |
| WO | 2012/057183 A1 | 5/2012 |
| WO | 2016/194416 A1 | 12/2016 |
| WO | 2017/168841 A1 | 10/2017 |

OTHER PUBLICATIONS

WinROOF2021 Function Comparison Table, Mitani Corporation, Jun. 15, 2021, 2 pages total, retrieved from https://www.mitanivisual.jp/products/hikakuhyo_wrf2021.pdf.

* cited by examiner

CUBIC BORON NITRIDE SINTERED MATERIAL

TECHNICAL FIELD

The present disclosure relates to a cubic boron nitride sintered material.

BACKGROUND ART

High hardness materials for use in cutting tools or the like include a cubic boron nitride sintered material (Hereinafter, also each referred to as "cBN sintered material".) (PTL 1 and PTL 2).

CITATION LIST

Patent Literature

PTL 1: Japanese Patent Laying-Open No. 2016-107396
PTL 2: WO 2012/057183

SUMMARY OF INVENTION

The presently disclosed cubic boron nitride sintered material is a cubic boron nitride sintered material comprising cubic boron nitride grains, a binder phase, and a void, wherein
 a percentage on a volume basis of the cubic boron nitride grains based on the total of the cubic boron nitride grains and the binder phase is 40% by volume or more and 70% by volume or less,
 a percentage on a volume basis of the binder phase based on the total of the cubic boron nitride grains and the binder phase is 30% by volume or more and 60% by volume or less,
 the binder phase includes 10% by volume or more and 100% by volume or less of aluminum oxide grains based on the entire binder phase,
 an average grain size of the aluminum oxide grains is 50 nm or more and 250 nm or less,
 the cubic boron nitride sintered material comprises 0.001% by volume or more and 0.100% by volume or less of one or more first voids, and
 at least one portion of each of the first voids is in contact with the aluminum oxide grains.

DETAILED DESCRIPTION

Problem to be Solved by the Present Disclosure

In recent years, a need for high-efficiency processing has been increased. When high-efficiency processing is performed with a tool using cubic boron nitride, a shortened tool life may be caused by breakage. Therefore, a cubic boron nitride sintered material is demanded in which, when the cubic boron nitride sintered material is used as a material for a tool, the tool can have a long tool life even in high-efficiency processing.

An object of the present disclosure is then to provide a cubic boron nitride sintered material in which, when the cubic boron nitride sintered material is used as a material for a tool, the tool can have a long tool life even in high-efficiency processing.

Advantageous Effect of the Present Disclosure

When the presently disclosed cubic boron nitride sintered material is used as a material for a tool, the tool can have a long tool life even in high-efficiency processing.

DESCRIPTION OF EMBODIMENTS

First, embodiments of the present disclosure will be listed and described.

(1) The presently disclosed cubic boron nitride sintered material is a cubic boron nitride sintered material comprising cubic boron nitride grains, a binder phase, and a void, wherein
 the percentage on a volume basis of the cubic boron nitride grains based on the total of the cubic boron nitride grains and the binder phase is 40% by volume or more and 70% by volume or less,
 the percentage on a volume basis of the binder phase based on the total of the cubic boron nitride grains and the binder phase is 30% by volume or more and 60% by volume or less,
 the binder phase includes 10% by volume or more and 100% by volume or less of aluminum oxide grains based on the entire binder phase,
 the average grain size of the aluminum oxide grains is 50 nm or more and 250 nm or less,
 the cubic boron nitride sintered material comprises 0.001% by volume or more and 0.100% by volume or less of one or more first voids, and
 at least one portion of each of the first voids is in contact with the aluminum oxide grains.

When the presently disclosed cubic boron nitride sintered material is used as a material for a tool, the tool can have a long tool life even in high-efficiency processing.

(2) Preferably, the binder phase is composed of 10% by volume or more and 98% by volume or less of the aluminum oxide grains and 2% by volume or more and 90% by volume or less of first binder phase grains,
 the first binder phase grains include one of or both
  at least one selected from a second group consisting of a material made of a single element selected from a first group consisting of a group 4 element, a group 5 element and a group 6 element of the periodic table, aluminum, silicon, iron, cobalt and nickel, and an alloy and an intermetallic compound each composed of two or more elements selected from the first group, and
  at least one selected from a fourth group consisting of a first compound composed of at least one element selected from the first group and at least one element selected from a third group consisting of nitrogen, carbon, boron and oxygen, and a solid solution of the first compound, and
 the first compound is free of aluminum oxide grains.
This leads to a further enhancement in tool life.

(3) The cubic boron nitride sintered material includes a plurality of the first voids, and the average distance between the first voids is preferably 1.0 μm or more and 20 μm or less. This leads to a further enhancement in tool life.

(4) The average of the cross-sectional areas of the first voids is preferably 0.001 μm² or more and 0.02 μm² or less. This leads to a further enhancement in tool life.

(5) Preferably, the cubic boron nitride grains include first cubic boron nitride grains, the grain sizes of the first cubic boron nitride grains are each 5% or more and 50% or less of the average grain size of the aluminum oxide grains, the percentage on a volume basis of the first cubic boron nitride grains relative to the binder phase is 1% or more and 30% or less, the first cubic boron nitride grains include 30% or more and 100% or less of first A cubic boron nitride grains on a number basis, and at least one portion of each of the first A cubic boron nitride grains is in contact with the aluminum oxide grains.

This leads to a further enhancement in tool life.

Detailed Description of Embodiments of the Present Disclosure

Specific examples of the presently disclosed cubic boron nitride sintered material will be described with reference to the drawing. The same reference symbol in the drawing in the present disclosure represents the same section or any corresponding section thereof. A dimensional relationship among the length, the width, the thickness, the depth, and the like is appropriately modified for clarification and simplification of the drawings, and does not necessarily represent an actual dimensional relationship.

The designation "A to B" regarding a numerical range herein means to include the upper limit and the lower limit of the range (namely, A or more and B or less), and when no unit is designated with A and any unit is designated with only B, the unit of A is the same as the unit of B.

When a compound or the like is herein represented by a chemical formula, the atomic ratio thereof, if not particularly limited, encompasses any atomic ratio conventionally known, and should not be necessarily limited to only any stoichiometric range. For example, when "TiN" is designated, the ratio among the numbers of atoms constituting TiN encompasses any atomic ratio conventionally known.

Embodiment 1: Cubic Boron Nitride Sintered Material

A cubic boron nitride sintered material of one embodiment of the present disclosure (Hereinafter, also referred to as "the present embodiment".) is a cubic boron nitride sintered material comprising cubic boron nitride grains, a binder phase, and a void, wherein the percentage on a volume basis of the cubic boron nitride grains based on the total of the cubic boron nitride grains and the binder phase is 40% by volume or more and 70% by volume or less, the percentage on a volume basis of the binder phase based on the total of the cubic boron nitride grains and the binder phase is 30% by volume or more and 60% by volume or less, the binder phase includes 10% by volume or more and 100% by volume or less of aluminum oxide grains based on the entire binder phase, the average grain size of the aluminum oxide grains is 50 nm or more and 250 nm or less, the cubic boron nitride sintered material comprises 0.001% by volume or more and 0.100% by volume or less of one or more first voids, and at least one portion of each of the first voids is in contact with the aluminum oxide grains.

When the cubic boron nitride sintered material of the present embodiment is used as a material for a tool, the tool can have a long tool life even in high-efficiency processing. The reason for this is presumed as the following (i) to (iv).

(i) The cubic boron nitride sintered material of the present embodiment includes cubic boron nitride grains having excellent strength and toughness, and the percentage on a volume basis of the cubic boron nitride grains based on the total of the cubic boron nitride grains and the binder phase is 40% by volume or more and 70% by volume or less. Thus, the cubic boron nitride sintered material can also have excellent strength and toughness. Accordingly, a tool using the cubic boron nitride sintered material can have excellent wear resistance and breakage resistance, and a tool using the cubic boron nitride sintered material can have a long tool life.

(ii) The cubic boron nitride sintered material of the present embodiment comprises 10% by volume or more and 100% by volume or less of aluminum oxide grains having excellent wear resistance (Hereinafter, also referred to as "$Al_2O_3$ grains".) based on the entire binder phase. Accordingly, the cubic boron nitride sintered material can have excellent wear resistance, and a tool using the cubic boron nitride sintered material can have a long tool life.

(iii) The average grain size of the aluminum oxide grains is 50 nm or more and 250 nm or less. When the average grain size of the aluminum oxide grains is in the above range, the cubic boron nitride sintered material can have excellent toughness. Accordingly, a tool using the cubic boron nitride sintered material can have excellent breakage resistance and can have a long tool life.

(iv) When a tool using the cubic boron nitride sintered material is used for high-efficiency processing, the cutting edge temperature is higher. The cubic boron nitride grains and the binder phase are different in thermal expansion coefficient, and thus thermal shock causes cracking to easily occur and causes breakage to be easily generated. When a void is present in the cubic boron nitride sintered material, the void absorbs the difference in thermal expansion coefficient between the cubic boron nitride grains and the binder phase, and thus the occurrence of cracking is suppressed.

In particular, when at least one portion of each void is in contact with the aluminum oxide grains, the effect of absorbing the difference in thermal expansion coefficient is high and the effect of suppressing the occurrence of cracking is excellent. In this regard, a too high content of the void in the cubic boron nitride sintered material tends to cause the void by itself to serve as the point of origin of cracking.

When the content of the first voids in the cubic boron nitride sintered material is 0.001% by volume or more and 0.100% by volume or less, not only the effect of absorbing the difference in thermal expansion coefficient by the voids is obtained, but also the voids by themselves can be inhibited from serving as the points of origin of cracking. In other words, when the content of the first void in the cubic boron nitride sintered material is 0.001% by volume or more and 0.100% by volume or less, the occurrence of cracking is effectively suppressed. Therefore, a tool using the cubic boron nitride sintered material of the present embodiment in which the content of the first void is 0.001% by volume or more and 0.10% by volume or less can be excellent in breakage resistance and can have a long tool life. This is a finding newly found by the present inventors.

<Contents of Cubic Boron Nitride Grains, Void and Binder Phase>

The cubic boron nitride sintered material of the present embodiment comprises cubic boron nitride grains, a binder phase, and a void. The cubic boron nitride sintered material of the present embodiment can include inevitable impurities due to raw materials, manufacturing conditions, and the like which are used, as long as the effect of the present disclosure is exerted. The cubic boron nitride sintered material of the present embodiment can be composed of cubic boron nitride grains, a binder phase, a void, and inevitable impurities. The content (% by mass) of inevitable impurities in the cubic boron nitride sintered material can be 1% by mass or less. The content of inevitable impurities in the cubic boron nitride sintered material can be measured with ICP (Inductively Coupled Plasma) Emission Spectroscopy (measurement apparatus: Shimadzu Corporation, "ICPS-8100" (registered trademark)).

In the cubic boron nitride sintered material of the present embodiment, the percentage on a volume basis of the cubic boron nitride grains based on the total of the cubic boron nitride grains and the binder phase (Hereinafter, also referred to as "the content of the cubic boron nitride grains".) is 40% by volume or more and 70% by volume or less. The lower limit of the content of the cubic boron nitride grains is 40% by volume or more, preferably 42% by volume or more, more preferably 45% by volume or more from the viewpoint of an enhancement in breakage resistance. The upper limit of the content of the cubic boron nitride grains is 70% by volume or less, preferably 68% by volume or less, more preferably 65% by volume or less from the viewpoint of an enhancement in sinterability. The content of the cubic boron nitride grains is 40% by volume or more and 70% by volume or less, preferably 42% by volume or more and 68% by volume or less, further preferably 45% by volume or more and 65% by volume or less.

In the cubic boron nitride sintered material of the present embodiment, the percentage on a volume basis of the binder phase based on the total of the cubic boron nitride grains and the binder phase (Hereinafter, also referred to as "the content of the binder phase".) is 30% by volume or more and 60% by volume or less. The lower limit of the content of the binder phase is 30% by volume or more, preferably 31% by volume or more, more preferably 33% by volume or more from the viewpoint of an enhancement in sinterability. The upper limit of the content of the binder phase in the cubic boron nitride sintered material is 60% by volume or less, preferably 58% by volume or less, more preferably 54% by volume or less from the viewpoint of an enhancement in breakage resistance. The content of the binder phase in the cubic boron nitride sintered material is 30% by volume or more and 60% by volume or less, preferably 31% by volume or more and 58% by volume or less, further preferably 33% by volume or more and 54% by volume or less.

Preferably, the cubic boron nitride sintered material of the present embodiment is composed of cubic boron nitride grains, a binder phase, and a void, the percentage on a volume basis of the cubic boron nitride grains based on the total of the cubic boron nitride grains and the binder phase is 40% by volume or more and 70% by volume or less, and the percentage on a volume basis of the binder phase based on the total of the cubic boron nitride grains and the binder phase is 30% by volume or more and 60% by volume or less. Preferably, the cubic boron nitride sintered material of the present embodiment is composed of cubic boron nitride grains, a binder phase, a void, and inevitable impurities, the percentage on a volume basis of the cubic boron nitride grains based on the total of the cubic boron nitride grains and the binder phase is 40% by volume or more and 70% by volume or less, and the percentage on a volume basis of the binder phase based on the total of the cubic boron nitride grains and the binder phase is 30% by volume or more and 60% by volume or less.

The cubic boron nitride sintered material of the present embodiment includes 0.001% by volume or more and 0.100% by volume or less of one or more first voids. The first voids are each a void, at least one portion of which is in contact with the aluminum oxide grains, among voids. The lower limit of the content of the first voids in the cubic boron nitride sintered material is 0.001% by volume or more, preferably 0.003% by volume or more, preferably 0.005% by volume or more from the viewpoint that the effect of absorbing the difference in thermal expansion coefficient between the cubic boron nitride grains and the binder phase is obtained. The upper limit of the content of the first voids in the cubic boron nitride sintered material is 0.100% by volume or less, preferably 0.080% by volume or less, preferably 0.060% by volume or less from the viewpoint that such each void is inhibited from serving as the point of origin of cracking. The content of the first voids in the cubic boron nitride sintered material is 0.001% by volume or more and 0.100% by volume or less, preferably 0.003% by volume or more and 0.080% by volume or less, preferably 0.005% by volume or more and 0.060% by volume or less.

The cubic boron nitride sintered material of the present embodiment can include a void in no contact with the aluminum oxide grains (Hereinafter, also referred to as "second void".) as long as the effect of the present disclosure is exerted. The content of the second void in the cubic boron nitride sintered material is preferably 0% by volume or more and 0.002% by volume or less, more preferably 0% by volume or more and 0.001% by volume or less, most preferably 0% by volume. In other words, no second void is most preferably included. Hereinafter, the first and second voids are also collectively designated as "void".

The content (% by volume) of the void, the content (% by volume) of the binder phase, the content (% by volume) of the cubic boron nitride grains, the content (% by volume) of the first voids, and the content (% by volume) of the second void, in the cubic boron nitride sintered material, are measured by the following procedures (A1) to (G1).

(A1) The cubic boron nitride sintered material is cut at a desired part to produce a sample including a cross section of the cubic boron nitride sintered material. The cross section can be produced using a focused ion beam device, a cross section polisher, or the like.

(B1) The cross section is observed with SEM at a magnification of 5000×, and a backscattered electron image and a secondary electron image are obtained. The observation magnification is 5000×, and thus the void in the cubic boron nitride sintered material can be clearly determined. In the backscattered electron image, a region where the void is present is a black region, a region where the cubic boron nitride grains are present is a dark gray region, and a region where the binder phase is present is a light gray region or a white region. In the secondary electron image, the region where the void is present is a concave region. The black region (region where the void is present) in the backscattered electron image and the concave region (region where the void is present) in the secondary electron image are collated to thereby allow for determination of the region where the void is present in the backscattered electron image.

Figure 1:
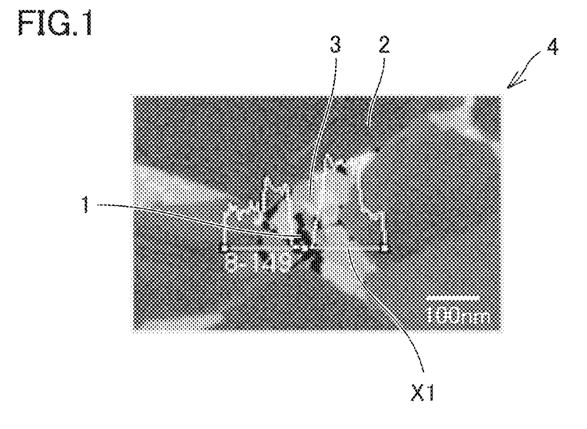
FIG. 1 shows one example of an image in which a contrast value is illustrated in a backscattered electron image of a cubic boron nitride sintered material of Embodiment 1.

Furthermore, the variation in quantitative determination due to image analysis described below can be decreased by adjusting the brightness value of the backscattered electron image as described below and then acquiring an image. When the backscattered electron image is taken, the image brightness value is divided to 256 (minimum brightness value: 0, maximum brightness value: 255) and the brightness value of the region where the void is present and the brightness value of the region where the cubic boron nitride grains are present, each determined above, are respectively set in the ranges of 0 or more and 30 or less and of more than 30. Thus, a pixel where the void is present in the backscattered electron image can be extracted. FIG. 1 shows an image in which the brightness value is illustrated in a backscattered electron image of the cubic boron nitride sintered material of the present embodiment. In a cubic boron nitride sintered material 4 in FIG. 1, a region where a void 1 is present is a black region, a region where a cubic boron nitride grain 2 is present is a dark gray region, and a region where a binder phase 3 is present is a light gray region or a white region. In FIG. 1, a longitudinal axis direction (not shown) perpendicular to a line X1 in a lateral direction in the image represents the brightness value. FIG. 1 indicates that the brightness value in the longitudinal axis direction on the line X1 is varied from 8 to 149.

(C1) The content of the void in the cubic boron nitride sintered material (the content (% by volume) of the total of the first and second voids) is measured by the following procedure. The backscattered electron image where the brightness value is adjusted is binarized with image analysis software ("WinROOF" from Mitani Corporation) under conditions set in advance with respect to the image analysis software.

A measurement region of 12 µm×9 µm is set in the image after the binarization. The area ratio of the region where the void is present, in the measurement region, is calculated. The area ratio calculated can be estimated in terms of % by volume, and thus the content (% by volume) of the void in the cubic boron nitride sintered material can be determined.

(D1) The content (% by volume) of the cubic boron nitride grains is measured by the following procedure. The backscattered electron image where the brightness value is adjusted is binarized with image analysis software ("WinROOF" from Mitani Corporation) under conditions set in advance with respect to the image analysis software. In the image after the binarization, the region where the void is present is a black region, the region where the cubic boron nitride grains are present is a dark gray region, and the region where the binder phase is present is a light gray region or a white region.

A measurement region of 12 µm×9 µm is set in the image after the binarization. The area ratio of a pixel assigned to a dark field (the black region and the dark gray region) (pixel assigned to the void and the cBN grains) in the area of a field of view for measurement, in the measurement region, is calculated. The area ratio of the void (the area ratio of the total of the first and second voids) is subtracted from the above area ratio, and thus the area ratio of the cubic boron nitride grains is calculated. The area ratio calculated can be estimated in terms of % by volume, and thus the content (% by volume) of the cubic boron nitride grains in the cubic boron nitride sintered material is calculated.

(E1) The content (% by volume) of the binder phase is calculated by the following procedure. The dark field (pixel assigned to the void and the cBN grains) is subtracted from 100% by area of the area ratio of the entire field of view for measurement in (D1) described above, and thus the area ratio of the binder phase is calculated. The area ratio calculated is estimated in terms of % by volume, and thus the content (% by volume) of the binder phase in the cubic boron nitride sintered material is calculated.

(F1) The content (% by volume) of the first voids and the content (% by volume) of the second void in the cubic boron nitride sintered material are measured by the following procedure. The backscattered electron image where the brightness value is adjusted is subjected to hue separation with image analysis software ("WinROOF" from Mitani Corporation), and the void and the aluminum oxide grains are then shown respectively by blue and green. The aluminum oxide grains in the backscattered electron image are identified by SEM-EDX (energy dispersive X-ray spectroscopy). Specifically, a region where Al and O are detected by SEM-EDX is considered to correspond to the aluminum oxide grains.

Figure 2:
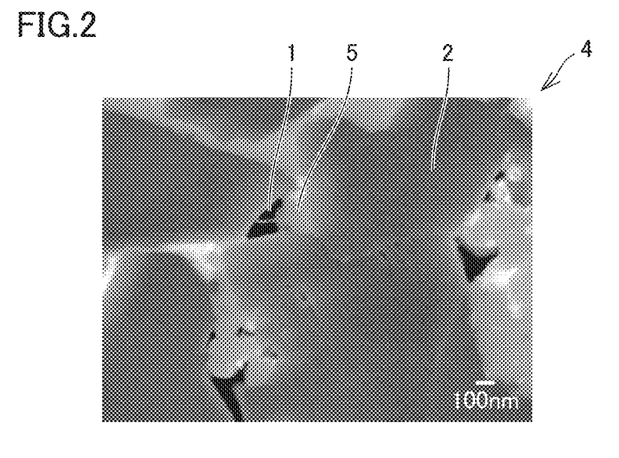
FIG. 2 shows one example of a backscattered electron image of the cubic boron nitride sintered material of Embodiment 1.

FIG. 2 shows one example of a backscattered electron image of the cubic boron nitride sintered material of the present embodiment. In a cubic boron nitride sintered material 4 in FIG. 2, the region where a void 1 is present is a black region, the region where a cubic boron nitride grain 2 is present is a dark gray region, and the region where a binder phase is present is a light gray region or a white region. In FIG. 2, the light gray region in the light gray region or the white region as the region where the binder phase is present corresponds to an aluminum oxide grain 5.

When a blue (void) region and a green ($Al_2O_3$ grain) region are in contact with each other and the length of the interface between the blue region and the green region is 5 nm or more in the backscattered electron image subjected to hue separation, at least one portion of the void indicated by the blue region is determined to be a first void in contact with the aluminum oxide grains. When, while a blue (void) region and a green ($Al_2O_3$ grain) region are in contact with each other, the length of the interface between the blue region and the green region is less than 5 nm, the region indicated by the blue region does not correspond to any first voids and is determined to correspond to the second void. The area ratio of the first voids and the area ratio of the second void in the measurement region are calculated based on the determination. The area ratio calculated is estimated in terms of % by volume, and thus the content (% by volume) of the first voids and the content (% by volume) of the second void in the cubic boron nitride sintered material can be determined.

(G1) (A1) to (F1) described above are carried out in five different measurement regions, and the content (% by volume) of the void, the content (% by volume) of the cubic boron nitride grains, the content (% by volume) of the binder phase, the content (% by volume) of the first voids, and the content (% by volume) of the second void are measured in each of the measurement regions. The averages with respect to the respective measurement values in the five measurement regions are defined as the content (% by volume) of the void, the content (% by volume) of the cubic boron nitride grains, the content (% by volume) of the binder phase, the content (% by volume) of the first voids, and the content (% by volume) of the second void in the cubic boron nitride sintered material of the present embodiment.

A very small void which is undetectable and exhibits the detection limit or less in the above measurement is removed as a noise.

It has been confirmed that, as long as the measurement is performed in the backscattered electron image where the brightness value is adjusted, measurement results of the content of each component are obtained without substantial variation and there is no arbitrariness even with a measurement region arbitrarily set, even when a location selected in the measurement regions is changed and the measurement is performed for a plurality of times.

<Binder Phase>

<<Aluminum Oxide Grains>>

In the present embodiment, the binder phase includes 10% by volume or more and 1000% by volume or less of aluminum oxide grains based on the entire binder phase, and the average grain size of the aluminum oxide grains is 50 nm or more and 250 nm or less.

The lower limit of the content of the aluminum oxide grains based on the entire binder phase is 10% by volume or more, preferably 13% by volume or more, further preferably 15% by volume or more from the viewpoint of an enhancement in wear resistance. The upper limit of the content of the aluminum oxide grains based on the entire binder phase is 100% by volume or less, preferably 98% by volume or less, further preferably 95% by volume or less from the viewpoint of an enhancement in breakage resistance. The content of the aluminum oxide grains based on the entire binder phase is 10% by volume or more and 100% by volume or less, preferably 10% by volume or more and 98% by volume or less, more preferably 13% by volume or more and 98% by volume or less, further preferably 15% by volume or more and 95% by volume or less.

The content (% by volume) of the aluminum oxide grains based on the entire binder phase, in the binder phase, is measured according to the following method. The same procedure as the measurement method (E1) of the content of the binder phase in the cubic boron nitride sintered material is adopted, and the content (% by volume) of the binder phase in the cubic boron nitride sintered material is calculated. Subsequently, the aluminum oxide grains in the same measurement region are identified by the procedure described with respect to the measurement method (F1) of the content of the first voids in the cubic boron nitride sintered material, and the area ratio thereof is measured. The area ratio is estimated in terms of % by volume, and thus the content (% by volume) of the aluminum oxide grains in the cubic boron nitride sintered material is obtained. The percentage of the content (% by volume) of the aluminum oxide grains in the cubic boron nitride sintered material relative to the content (% by volume) of the binder phase in the cubic boron nitride sintered material is calculated. The percentage corresponds to the content (% by volume) of the aluminum oxide grains based on the entire binder phase.

The content (% by volume) of the aluminum oxide grains based on the entire binder phase is measured in five different measurement regions. The average of measurement values in the five measurement regions is defined as the content (% by volume) of the aluminum oxide grains based on the entire binder phase in the cubic boron nitride sintered material of the present embodiment.

It has been confirmed that, as long as the measurement is performed in the same sample, measurement results are obtained without substantial variation and there is no arbitrariness even with a measurement region arbitrarily set, even when a location selected in the measurement regions is changed and the measurement is performed for a plurality of times.

In the present embodiment, the average grain size of the aluminum oxide grains is 50 nm or more and 250 nm or less. The average grain size of the aluminum oxide grains here means the arithmetic average diameter on a number basis with respect to the equivalent circular diameters of the aluminum oxide grains observed in a desired cross section of the cubic boron nitride sintered material. The lower limit of the average grain size of the aluminum oxide grains is 50 nm or more, preferably 60 nm or more, further preferably 70 nm or more from the viewpoint of an enhancement in toughness of the cubic boron nitride sintered material. The upper limit of the average grain size of the aluminum oxide grains is 250 nm or less, preferably 230 nm or less, further preferably 200 nm or less from the viewpoint of an enhancement in breakage resistance of the cubic boron nitride sintered material. The average grain size of the aluminum oxide grains is 50 nm or more and 250 nm or less, preferably 60 nm or more and 230 nm or less, further preferably 70 nm or more and 200 nm or less.

The average grain size of the aluminum oxide grains (arithmetic average) is measured according to the following method. The aluminum oxide grains are identified by the procedure described with respect to the measurement method (F1) of the content of the first voids in the cubic boron nitride sintered material. The equivalent circular diameter of each of the aluminum oxide grains in the measurement region is measured with the image analysis software. The average grain size of the aluminum oxide grains (the arithmetic average on a number basis) in the measurement region is calculated based on the equivalent circular diameter of each of the aluminum oxide grains.

The measurement is carried out in five different measurement regions. The average of the average grain sizes of the aluminum oxide grains in the five measurement regions is defined as the average grain size of the aluminum oxide grains in the cubic boron nitride sintered material of the present embodiment.

It has been confirmed that, as long as the measurement is performed in the same sample, measurement results are obtained without substantial variation and there is no arbitrariness even with a measurement region arbitrarily set, even when a location selected in the measurement regions is changed and the measurement is performed for a plurality of times.

First Binder Phase Grains>>

In the present embodiment, preferably, the binder phase is composed of 10% by volume or more and 98% by volume or less of the aluminum oxide grains and 2% by volume or more and 90% by volume or less of first binder phase grains,
  the first binder phase grains include one of or both
    at least one selected from a second group consisting of
      a material made of a single element selected from a first group consisting of a group 4 element, a group 5 element and a group 6 element of the periodic table, aluminum, silicon, iron, cobalt and nickel, and
      an alloy and an intermetallic compound each composed of two or more elements selected from the first group, and
    at least one selected from a fourth group consisting of
      a first compound composed of at least one element selected from the first group and at least one element selected from a third group consisting of nitrogen, carbon, boron and oxygen, and a solid solution of the first compound, and the first compound is free of aluminum oxide grains.

The first binder phase grains are particularly high in force to bind to the cubic boron nitride grains. Accordingly, the cubic boron nitride sintered material comprising the first binder phase grains can have excellent wear resistance and breakage resistance, and a tool using the cubic boron nitride sintered material can have a long tool life.

The first binder phase grains can be in any form of the following (a) to (f).
(a) The first binder phase grains consist of at least one selected from the second group.
(b) The first binder phase grains include at least one selected from the second group.
(c) The first binder phase grains consist of at least one selected from the fourth group.
(d) The first binder phase grains include at least one selected from the fourth group.
(e) The first binder phase grains consist of at least one selected from the second group and at least one selected from the fourth group.
(f) The first binder phase grains include at least one selected from the second group and at least one selected from the fourth group.

Examples of the group 4 element of the periodic table include titanium (Ti), zirconium (Zr) and hafnium (Hf). Examples of the group 5 element include vanadium (V), niobium (Nb) and tantalum (Ta). Examples of the group 6 element include chromium (Cr), molybdenum (Mo) and tungsten (W). Hereinafter, any element included in the first group consisting of the group 4 element, the group 5 element, the group 6 element, aluminum, silicon, iron, cobalt and nickel will be also referred to as "first element".

Examples of the alloy of the first element include Ti—Zr, Ti—Hf, Ti—V, Ti—Nb, Ti—Ta, Ti—Cr and Ti—Mo. Examples of the intermetallic compound of the first element include $TiCr_2$, $Ti_3Al$ and Co—Al.

Examples of the first compound (nitride) including the first element and nitrogen can include titanium nitride (TiN), zirconium nitride (ZrN), hafnium nitride (HfN), vanadium nitride (VN), niobium nitride (NbN), tantalum nitride (TaN), chromium nitride ($Cr_2N$), molybdenum nitride ($Mo_2N$), tungsten nitride (WN), aluminum nitride (AlN), silicon nitride ($Si_3N_4$), cobalt nitride (CoN), nickel nitride (NiN), titanium zirconium nitride (TiZrN), titanium hafnium nitride (TiHfN), titanium vanadium nitride (TiVN), titanium niobium nitride (TiNbN), titanium tantalum nitride (TiTaN), titanium chromium nitride (TiCrN), titanium molybdenum nitride (TiMoN), titanium tungsten nitride (TiWN), titanium aluminum nitride (TiAlN, $Ti_2AlN$, $Ti_3AlN$), zirconium hafnium nitride (ZrHfN), zirconium vanadium nitride (ZrVN), zirconium niobium nitride (ZrNbN), zirconium tantalum nitride (ZrTaN), zirconium chromium nitride (ZrCrN), zirconium molybdenum nitride (ZrMoN), zirconium tungsten nitride (ZrWN), hafnium vanadium nitride (HfVN), hafnium niobium nitride (HfNbN), hafnium tantalum nitride (HfTaN), hafnium chromium nitride (HfCrN), hafnium molybdenum nitride (HfMoN), hafnium tungsten nitride (HfWN), vanadium niobium nitride (VNbN), vanadium tantalum nitride (VTaN), vanadium chromium nitride (VCrN), vanadium molybdenum nitride (VMoN), vanadium tungsten nitride (VWN), niobium tantalum nitride (NbTaN), niobium chromium nitride (NbCrN), niobium molybdenum nitride (NbMoN), niobium tungsten nitride (NbWN), tantalum chromium nitride (TaCrN), tantalum molybdenum nitride (TaMoN), tantalum tungsten nitride (TaWN), chromium molybdenum nitride (CrMoN), chromium tungsten nitride (CrWN) and molybdenum tungsten nitride (MoW N).

Examples of the first compound (carbide) including the first element and carbon can include titanium carbide (TiC), zirconium carbide (ZrC), hafnium carbide (HfC), vanadium carbide (VC), niobium carbide (NbC), tantalum carbide (TaC), chromium carbide ($Cr_3C_2$), molybdenum carbide (MoC), tungsten carbide (WC), silicon carbide (SiC), tungsten-cobalt carbide ($W_2Co_3C$) and titanium-aluminum carbide ($Ti_2AlC$).

Examples of the first compound (boride) including the first element and boron can include titanium boride ($TiB_2$), zirconium boride ($ZrB_2$), hafnium boride ($HfB_2$), vanadium boride ($VB_2$), niobium boride ($NbB_2$), tantalum boride ($TaB_2$), chromium boride (CrB), molybdenum boride (MoB), tungsten boride (WB), aluminum boride ($AlB_2$), cobalt boride ($Co_2B$), nickel boride ($Ni_2B$) and tungsten cobalt boride ($W_2Co_{21}B_6$).

Examples of the first compound (oxide) including the first element and oxygen can include titanium oxide ($TiO_2$), zirconium oxide ($ZrO_2$), hafnium oxide ($HfO_2$), vanadium oxide ($V_2O_5$), niobium oxide ($Nb_2O_5$), tantalum oxide ($Ta_2O_5$), chromium oxide ($Cr_2O_3$), molybdenum oxide ($MoO_3$), tungsten oxide ($WO_3$), silicon oxide ($SiO_2$), cobalt oxide (CoO) and nickel oxide (NiO).

Examples of the first compound (carbonitride) including the first element, carbon and nitrogen can include titanium carbonitride (TiCN), zirconium carbonitride (ZrCN), hafnium carbonitride (HfCN), titanium niobium carbonitride (TiNbCN), titanium zirconium carbonitride (TiZrCN), titanium hafnium carbonitride (TiHfCN), titanium tantalum carbonitride (TiTaCN) and titanium chromium carbonitride (TiCrCN).

Examples of the first compound (oxynitride) including the first element, oxygen and nitrogen can include titanium oxynitride (TiON), zirconium oxynitride (ZrON), hafnium oxynitride (HON), vanadium oxynitride (VON), niobium oxynitride (NbON), tantalum oxynitride (TaON), chromium oxynitride (CrON), molybdenum oxynitride (MoON), tungsten oxynitride (WON), aluminum oxynitride (AlON) and silicon aluminum oxynitride (SiAlON).

The solid solution of the first compound means a state where two or more of such first compounds are dissolved in each other's crystal structure, and means an interstitial solid solution or a substitutional solid solution. Examples can include a $Al_2O_3$—$ZrO_2$ solid solution.

The first compound may be used singly or in combinations of two kinds or more thereof.

The content of the first binder phase grains in the binder phase is preferably 2% by volume or more and 90% by volume or less. This leads to an enhancement in breakage resistance of the cubic boron nitride sintered material. The lower limit of the content of the first binder phase grains in the binder phase is preferably 2% by volume or more, preferably 3% by volume or more, more preferably 5% by volume or more. The upper limit of the content of the first binder phase grains in the binder phase is preferably 90%/o by volume or less, more preferably 87% by volume or less, further preferably 85% by volume or less.

The total content of the first binder phase grains in the binder phase is calculated by the following procedure. The content (% by volume) of the aluminum oxide grains based on the entire binder phase is measured by the same procedure as in the measurement method of the content of the aluminum oxide grains based on the entire binder phase. The content (% by volume) of the aluminum oxide grains based on the entire binder phase is subtracted from the entire binder phase (100% by volume), and thus the total content of the first binder phase grains in the binder phase (% by volume) is calculated.

The composition of the binder phase can be determined through XRD (X-ray Diffraction).

<The Distance Between the First Voids>

The cubic boron nitride sintered material of the present embodiment includes a plurality of the first voids, and the average distance between the first voids is preferably 1.0 µm or more and 20 µm or less. This leads to a further enhancement in tool life. The reason for this is presumed as follows: the first voids exist in a dispersed state in the cubic boron nitride sintered material and the occurrence of cracking is substantially uniformly suppressed in the entire region of the cubic boron nitride sintered material.

The lower limit of the average distance between the first voids is preferably 1.0 µm or more, more preferably 1.5 µm or more, further preferably 2.0 µm or more from the viewpoint that the first voids are inhibited from being closely spaced and serving as the points of origin of breakage. The upper limit of the average distance between the first voids is preferably 20 µm or less, preferably 15 µm or less, preferably 10 µm or less from the viewpoint of an enhancement in effect of relaxation of stress by the first voids. The average distance between the first voids is preferably 1.0 µm or more and 20 µm or less, more preferably 1.5 µm or more and 15 µm or less, further preferably 2.0 µm or more and 10 µm or less.

The average distance between the first voids is measured according to the following method. The same procedure as (F1) in the measurement method of the content of the first voids in the cubic boron nitride sintered material is adopted, and the first voids in the backscattered electron image are extracted. A measurement region (12 µm×9 µm) is set in the image binarized. The position of the center of gravity in each such first void in the measurement region is derived with the image processing software. The center of gravity coordinate determined is counted as the mother point, and Voronoi tessellation processing is performed to calculate each Voronoi region. The length of the line segment connecting the center of gravity coordinates of the respective mother points of adjacent Voronoi regions is calculated. The length calculated of the line segment is defined as the distance between the first voids. The average distance between the first voids in the measurement region is calculated. The average distance between the first voids is measured in five different measurement regions. The average of measurement values in the five measurement regions is defined as the average distance between the first voids in the cubic boron nitride sintered material of the present embodiment.

It has been confirmed that, as long as the measurement is performed in the same sample, measurement results are obtained without substantial variation and there is no arbitrariness even with a measurement region arbitrarily set, even when a location selected in the measurement regions is changed and the measurement is performed for a plurality of times.

<Cross-Sectional Areas of First Voids>

The average of the cross-sectional areas of the first voids in the cubic boron nitride sintered material of the present embodiment is preferably 0.001 µm$^2$ or more and 0.02 µm$^2$ or less. This leads to a further enhancement in tool life. The reason for this is presumed as follows: the effect of relaxation of thermal stress by the first voids is enhanced and the first voids are inhibited from serving as the points of origin of cracking.

The lower limit of the average of the cross-sectional areas of the first voids is preferably 0.001 µm$^2$ or more, more preferably 0.002 µm$^2$ or more, further preferably 0.003 µm$^2$ or more from the viewpoint of an enhancement in effect of relaxation of thermal stress by the first voids. The upper limit of the average of the cross-sectional areas of the first voids is preferably 0.02 µm$^2$ or less, more preferably 0.015 µm$^2$ or less, further preferably 0.010 µm$^2$ or less from the viewpoint that the first voids are inhibited from serving as the points of origin of cracking. The average of the cross-sectional areas of the first voids is preferably 0.001 µm$^2$ or more and 0.02 µm$^2$ or less, more preferably 0.002 µm$^2$ or more and 0.015 µm$^2$ or less, further preferably 0.003 µm$^2$ or more and 0.010 µm$^2$ or less.

The average of the cross-sectional areas of the first voids is measured according to the following method. The same procedure as (F1) in the measurement method of the content of the first voids in the cubic boron nitride sintered material is adopted, and the first voids are extracted in the backscattered electron image. A measurement region (12 µm×9 µm) is set in the image binarized. The cross-sectional area of each of the first voids in the measurement region is measured with the image processing software. When two or more of the first voids are adjacent to each other and also at least one pixel as a pixel indicating each of such first voids is adjacent, two or more such first voids to which the pixel is adjacent are counted as one void and the cross-sectional area is calculated. The average of the cross-sectional areas of all the first voids in the measurement region is calculated. The average of the cross-sectional areas here means the arithmetic average on a number basis of the cross-sectional areas. When the number of the first voids present in the measurement region is 1, the cross-sectional area of such one first void is defined as the average of the cross-sectional areas. The average of the cross-sectional areas is measured in five different measurement regions. The average of measurement values in the five measurement regions is defined as the average of the cross-sectional areas of the first voids in the cubic boron nitride sintered material of the present embodiment.

It has been confirmed that, as long as the measurement is performed in the same sample, measurement results are obtained without substantial variation and there is no arbitrariness even with a measurement region arbitrarily set, even when a location selected in the measurement regions is changed and the measurement is performed for a plurality of times.

<Cubic Boron Nitride Grains>

The cubic boron nitride grains are composed of cubic boron nitride. The cubic boron nitride grains can include inevitable impurities as long as the effect of the present disclosure is exerted.

In the cubic boron nitride sintered material of the present embodiment, preferably, the cubic boron nitride grains include first cubic boron nitride grains, the grain sizes of the first cubic boron nitride grains are each 5% or more and 50% or less of the average grain size of the aluminum oxide grains, the percentage on a volume basis of the first cubic boron nitride grains relative to the binder phase is 1% or more and 30% or less, the first cubic boron nitride grains include 30% or more and 100% or less of first A cubic boron nitride grains on a number basis, and at least one portion of each of the first A cubic boron nitride grains is in contact with the aluminum oxide grains. This leads to a further enhancement in life of a cutting tool using the cubic boron nitride sintered material. The reason for this, although is not clear, is presumed as follows: the first A cubic boron nitride grains smaller in grain size than the aluminum oxide grains are in contact with the aluminum oxide grains to result in suppression of grain growth of the aluminum oxide grains and an enhancement in deflective strength of the cubic boron nitride sintered material.

<<First Cubic Boron Nitride Grains>>

In the present embodiment, the first cubic boron nitride grains mean cubic boron nitride grains whose grain sizes are 5% or more and 50% or less of the average grain size of the aluminum oxide grains. The grain sizes of the first cubic boron nitride grains here mean the equivalent circular diameters of the first cubic boron nitride grains observed in a desired cross section of the cubic boron nitride sintered material. It is presumed that the first cubic boron nitride grains are easily placed between the aluminum oxide grains and the effect of suppressing grain growth of the aluminum oxide grains by the first cubic boron nitride grains is easily obtained. When the grain sizes of the first cubic boron nitride grains are 5% or more of the average grain size of the aluminum oxide grains, deterioration in breakage resistance due to deterioration in toughness in the cubic boron nitride sintered material is suppressed.

The grain sizes of the first cubic boron nitride grains are specifically preferably 2.5 nm or more and 125 nm or less, more preferably 5 nm or more and 100 nm or less, further preferably 10 nm or more and 80 nm or less.

The first cubic boron nitride grains in the cubic boron nitride sintered material of the present embodiment are identified by the following procedures (A2) to (E2).

(A2) The cubic boron nitride sintered material is cut at a desired part to produce a sample including a cross section of the cubic boron nitride sintered material. The cross section is produced using a focused ion beam device, a cross section polisher, or the like.

(B2) The cross section is observed with SEM at a magnification of 30000×, and a backscattered electron image and a secondary electron image are obtained. An observation region is set so that the area percentage of the binder phase is 50% by area or more. In the backscattered electron image, a region where the void is present is a black region, a region where the cubic boron nitride grains are present is a dark gray region, and a region where the binder phase is present is a light gray region or a white region. In the secondary electron image, the region where the void is present is a concave region.

Figure 3:
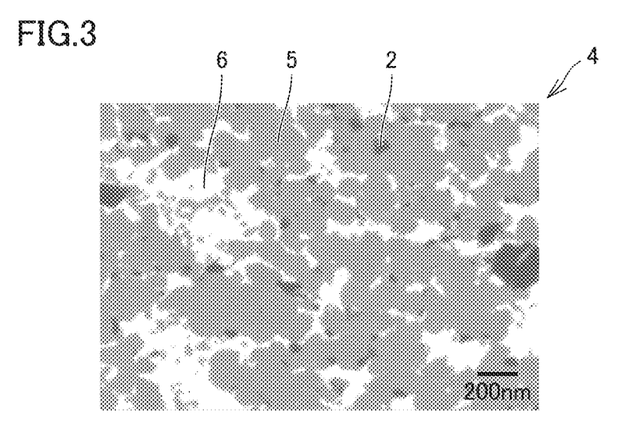
FIG. 3 shows another example of a backscattered electron image of the cubic boron nitride sintered material of Embodiment 1.

FIG. 3 shows one example of a backscattered electron image of the observation region in the cubic boron nitride sintered material of the present embodiment. In a cubic boron nitride sintered material 4 in FIG. 3, a region where the cubic boron nitride grains are present is a dark gray region 2, and a region where the binder phase is present is a light gray region or a white region. In FIG. 3, in the light gray region or the white region as the region where the binder phase is present, the light gray region and the white region respectively correspond to an aluminum oxide grain 5 and a first binder phase grain 6.

(C2) The backscattered electron image is binarized with image analysis software ("WinROOF" from Mitani Corporation). A measurement region of 3.0 μm×1.8 μm is set in the image after the binarization.

(D2) A pixel assigned to the cubic boron nitride grains in the measurement region is identified based on a pixel assigned to the dark field (the black region and the dark gray region) (pixel assigned to the void and the cubic boron nitride grains) and a pixel assigned to the black region (pixel assigned to the void) and the equivalent circular diameters of the cubic boron nitride grains are measured, with the image analysis software, based on the procedure of (D1) in the measurement method of the content (% by volume) of the cubic boron nitride grains.

(E2) The equivalent circular diameter of each of the cubic boron nitride grains is compared with the average grain size of the aluminum oxide grains (arithmetic average), and thus the first cubic boron nitride grains are identified.

The percentage on a volume basis of the first cubic boron nitride grains in the binder phase is preferably 1% or more and 30% or less. When the percentage on a volume basis of the first cubic boron nitride grains in the binder phase is 1% or more, the effect of suppressing grain growth of the aluminum oxide grains by the first cubic boron nitride grains is easily obtained. When the percentage on a volume basis of the first cubic boron nitride grains relative to the binder phase is 30% or less, deterioration in sinterability due to increases in surface areas of low-sinterable first cubic boron nitride grains is suppressed. The percentage on a volume basis of the first cubic boron nitride grains relative to the binder phase is preferably 1% or more and 30% or less, more preferably 2% or more and 25% or less, further preferably 3% or more and 20% or less.

In the present embodiment, the percentage on a volume basis of the first cubic boron nitride grains relative to the binder phase is measured by the following procedures (A3) to (D3).

(A3) The same procedures as (A2) to (D2) in the identification method of the first cubic boron nitride grains are adopted, and the first cubic boron nitride grains in the measurement region are identified. The area ratio (% by area) of the first cubic boron nitride grains in the measurement region is measured with the image processing software. The area ratio calculated is estimated in terms of % by volume, and thus the content (% by volume) of the first cubic boron nitride grains in the cubic boron nitride sintered material is calculated.

(B3) The content (% by volume) of the binder phase in the cubic boron nitride sintered material in the measurement region is measured according to the same method as (E1) in the measurement method of the content (% by volume) of the binder phase.

(C3) The percentage on a volume basis of the first cubic boron nitride grains relative to the binder phase is calculated based on the content (% by volume) of the first cubic boron nitride grains, determined in (A3), and the content (% by volume) of the binder phase, determined in (B3). The percentage on a volume basis of the first cubic boron nitride grains relative to the binder phase is measured in five different measurement regions. The average of measurement values in the five measurement regions is defined as the percentage on a volume basis of the first cubic boron nitride grains relative to the binder phase in the cubic boron nitride sintered material of the present embodiment.

It has been confirmed that, as long as the measurement is performed in the same sample, measurement results are obtained without substantial variation and there is no arbitrariness even with a measurement region arbitrarily set, even when a location selected in the measurement regions is changed and the measurement is performed for a plurality of times.

<<First A Cubic Boron Nitride Grains>>

In the present embodiment, the first A cubic boron nitride grains mean cubic boron nitride grains, at least one portion of each of which is in contact with the aluminum oxide grains, among the first cubic boron nitride grains. Preferably, the first cubic boron nitride grains include 30% or more and 100% or less of first A cubic boron nitride grains on a number basis and at least one portion of each of the first A cubic boron nitride grains is in contact with the aluminum oxide grains. It is presumed that this allows the effect of suppressing grain growth of the aluminum oxide grains by the first cubic boron nitride grains to be easily obtained.

The lower limit of the content on a number basis of the first A cubic boron nitride grains of the first cubic boron nitride grains is preferably 30% or more, more preferably 40% or more, further preferably 50% or more from the viewpoint of an enhancement in effect of suppressing grain growth of the aluminum oxide grains by the first cubic boron nitride grains. The upper limit of the content on a number basis of the first A cubic boron nitride grains of the first cubic boron nitride grains is preferably higher and thus is preferably 100% or less, and can be 98% or less, 95% or less from the viewpoint of manufacturing. The content on a number basis of the first A cubic boron nitride grains of the first cubic boron nitride grains is preferably 30% or more and 100% or less, preferably 40% or more and 98% or less, preferably 50% or more and 95% or less.

The content on a number basis of the first A cubic boron nitride grains of the first cubic boron nitride grains in the cubic boron nitride sintered material of the present embodiment is measured by the following procedures (A4) to (C4).

(A4) The same procedures as (A3) to (D3) in the identification method of the first cubic boron nitride grains are adopted, and the first cubic boron nitride grains in the measurement region are identified. The number of the first cubic boron nitride grains in the measurement region is measured with the image analysis software. When two or more of the first cubic boron nitride grains are adjacent to each other and also at least one pixel as a pixel indicating such adjacent first cubic boron nitride grains is adjacent, two or more such first cubic boron nitride grains to which the pixel is adjacent are counted as one first cubic boron nitride grain and the number is counted.

(B4) Hue separation is carried out in the measurement region, and the cubic boron nitride grains are shown by green and the aluminum oxide grains are shown by red. The first A cubic boron nitride grains, at least one of each of which is in contact with the aluminum oxide grains, among the first cubic boron nitride grains, are extracted based on the hue separation. The aluminum oxide grains being in contact with the first cubic boron nitride grains here means a case where the length of the interface therebetween is 5 nm or more. Accordingly, when, while the first cubic boron nitride grains and the aluminum oxide grains are in contact with each other, the length of the interface therebetween is less than 5 nm, the cubic boron nitride grains do not correspond to the first A cubic boron nitride grains. The number of the first A cubic boron nitride grains in the measurement region is measured with the image analysis software. When two or more of the first A cubic boron nitride grains are adjacent to each other and also at least one pixel as a pixel indicating adjacent such first A cubic boron nitride grains is adjacent, two or more such first A cubic boron nitride grains to which the pixel is adjacent are counted one grain and the number is counted.

(C4) The content on a number basis of the first A cubic boron nitride grains of the first cubic boron nitride grains is calculated based on the number of the first cubic boron nitride grains, determined in (A3), and the number of the first A cubic boron nitride grains, determined in (B4). The content on a number basis of the first A cubic boron nitride grains of the first cubic boron nitride grains is measured in five different measurement regions. The average of measurement values in the five measurement regions is defined as the content on a number basis of the first A cubic boron nitride grains of the first cubic boron nitride grains in the cubic boron nitride sintered material of the present embodiment.

It has been confirmed that, as long as the measurement is performed in the same sample, measurement results are obtained without substantial variation and there is no arbitrariness even with a measurement region arbitrarily set, even when a location selected in the measurement regions is changed and the measurement is performed for a plurality of times.

<Applications>

The presently disclosed cubic boron nitride sintered material is suitably applied to cutting tools, wear resistant tools, grinding tools, and the like.

The cutting tool, wear resistant tool and grinding tool using the presently disclosed cubic boron nitride sintered material may be each entirely composed of the cubic boron nitride sintered material or only partially (for example, in a cutting edge portion in the case of the cutting tool) composed of the cubic boron nitride sintered material. A coating film may be formed on a surface of each of such tools.

Examples of the cutting tool can include drills, end mills, indexable cutting inserts for drills, indexable cutting inserts for end mills, indexable cutting inserts for milling, indexable cutting inserts for turning, metal saws, gear cutting tools, reamers, taps, and cutting bites.

Examples of the wear resistant tool can include dies, scribers, scribing wheels, and dressers. Examples of the grinding tool can include grinding stone.

Embodiment 2: Method for Manufacturing Cubic Boron Nitride Sintered Material

The presently disclosed cubic boron nitride sintered material can be produced according to, for example, the following method.

<Raw Material Preparation Step>

A cubic boron nitride powder (Hereinafter, also referred to as "cBN powder".) and an aluminum oxide powder are prepared. When the binder phase includes the first binder phase grains, in addition to the aluminum oxide grains, a raw material powder for the first binder phase grains (Hereinafter, also referred to as "raw material powder for a first binder phase".) is prepared.

The cBN powder is not particularly limited, and a known cBN powder can be used. The D50 (average grain size) of the cBN powder is not particularly limited, and can be, for example, 0.1 to 12.0 μm. The average grain size of the raw material powder herein means the median diameter $D_{50}$ in equivalent circular diameter. The average grain size is measured with a grain size distribution measurement apparatus manufactured by Microtrac MRB (trade name: MT3300EX).

The cBN powder here used is preferably of two cBN powders different in average grain size from each other. In this case, the average grain size of the cBN powder larger in average grain size is preferably 0.5 to 5 μm. The average grain size of the cBN powder smaller in average grain size is preferably 0.01 to 0.3 μm. The cBN powder smaller in average grain size can be used to thereby effectively suppress grain growth of the aluminum oxide grains in a sintering step described below. Therefore, strength of the resulting cubic boron nitride sintered material is enhanced.

The aluminum oxide powder is not particularly limited, and a known aluminum oxide powder can be used. The $D_{50}$ (average grain size) of the aluminum oxide powder is not particularly limited, and can be, for example, 0.05 to 0.25 µm.

The raw material powder for a first binder phase can have the same composition as at least one portion of components constituting the first binder phase. The raw material powder for the binder phase, here used, can be a powder composed of a material made of a single element selected from a first group consisting of a group 4 element, a group 5 element and a group 6 element of the periodic table, aluminum, silicon, iron, cobalt and nickel, an alloy and an intermetallic compound each composed of two or more elements selected from the first group, a first compound composed of at least one element selected from the first group and at least one element selected from a third group consisting of nitrogen, carbon, boron and oxygen, and/or a solid solution of the first compound. More specifically, a $ZrO_2$ powder, an $Al_2O_3$—$ZrO_2$ solid solution powder, a $ZrB_2$ powder, a TiC powder, a TiN powder, a $Ti_2AlN$ powder, a $Ti_2AlC$ powder, a WC—Co powder, an Al powder, or the like can be used. The raw material powder for the first binder phase is not particularly limited, and can be prepared according to a conventionally known method. The $D_{50}$ (average grain size) of the raw material powder for the first binder phase is not particularly limited, and can be, for example, 0.05 to 2 µm.

<Mixing Step>

Next, the cBN powder and the aluminum oxide powder, prepared above, are mixed and stirred by a planetary stirring apparatus (hereinafter, also referred to as "primary mixing"), and thus a primary powdery mixture is obtained. When two cBN powders different in grain size from each other are used in the cBN powder, both such two powders are mixed. An alumina medium is used during stirring. The mixing and stirring methods may be each in a wet manner or a dry manner. The mixing time of the primary mixing can be 0.1 hours or more and less than 2 hours, or can also be 0.1 hours or more and 1.5 hours or less. The alumina medium is used and the mixing time is as described above, and thus the content of the void in the cubic boron nitride sintered material can be controlled. This is a finding newly found by the present inventors.

Next, the primary powdery mixture and the first binder phase powder are mixed (hereinafter, also referred to as "secondary mixing"), and thus a secondary powdery mixture is obtained. The mixing method is a method including no pulverization. Examples include planetary mixing without a jet mill and a medium.

<Sintering Step>

The secondary powdery mixture is brought into contact with a WC-6% Co cemented carbide disc and a Co (cobalt) foil and thus introduced into a container made of Ta (tantalum), and the container is vacuumed and sealed. A belt-type ultrahigh-pressure and ultrahigh-temperature generator is used and thus the powdery mixture introduced into the container made of Ta is pressurized to a pressure of 5 GPa or more and 7 GPa or less and then heated to a temperature of 1300° C. or more and 1500° C. or less, and held and sintered under pressure and temperature conditions after the pressurizing and heating, for 15 minutes or more and 30 minutes or less. The sintering conditions are adopted, and thus the content of the void in the cubic boron nitride sintered material can be controlled. This is a finding newly found by the present inventors. Thus, the cubic boron nitride sintered material of the present embodiment is produced.

Characteristics of Manufacturing Method of Present Embodiment

A method for manufacturing a cubic boron nitride sintered material comprising aluminum oxide grains has conventionally tended to cause easy generation of a void serving as the point of origin of cracking due to low sinterability of aluminum oxide grains and deterioration in breakage resistance of a cubic boron nitride sintered material. An increase in sintering temperature is considered for a decrease of such a void. However, an increase in sintering temperature results in grain growth of aluminum oxide grains and an increase in grain size, resulting in deteriorations in strength and wear resistance. Therefore, it has been difficult for a cubic boron nitride sintered material comprising aluminum oxide grains to satisfy both wear resistance and breakage resistance.

The present inventors have made intensive studies, and as a result, have newly found that the mixing step and the sintering step are adopted in a method for manufacturing a cubic boron nitride sintered material and thus a cubic boron nitride sintered material can be obtained in which the void content can be controlled and which has not only excellent wear resistance due to inclusion of aluminum oxide grains, but also excellent breakage resistance.

[Note 1]

The cubic boron nitride sintered material of the present embodiment preferably consists of cubic boron nitride grains, a binder phase, and a void, wherein, preferably, the percentage on a volume basis of the cubic boron nitride grains based on the total of the cubic boron nitride grains and the binder phase is 40% by volume or more and 70% by volume or less and the percentage on a volume basis of the binder phase based on the total of the cubic boron nitride grains and the binder phase is 30% by volume or more and 60% by volume or less.

[Note 2]

The cubic boron nitride sintered material of the present embodiment preferably consists of cubic boron nitride grains, a binder phase, a void, and inevitable impurities, wherein, the percentage on a volume basis of the cubic boron nitride grains based on the total of the cubic boron nitride grains and the binder phase is 40% by volume or more and 70% by volume or less and the percentage on a volume basis of the binder phase based on the total of the cubic boron nitride grains and the binder phase is 30% by volume or more and 60% by volume or less.

EXAMPLES

The present embodiment will be more specifically described with reference to Examples. However, the present embodiment is not limited to these Examples.

Example 1

[Production of Cubic Boron Nitride Sintered Material]

Each cubic boron nitride sintered material of Sample Nos. shown in Table 1 to Table 4 was produced by the following procedure.

<Raw Material Preparation Step>

Known two cBN powders different in average grain size from each other (average grain size 2 µm (designated as "cBN powder, Larger grain size" in Table 1), average grain size 0.1 µm (designated as "cBN powder, Smaller grain size" in Table 1)), a known aluminum oxide powder (average grain size 0.1 µm, designated as "$Al_2O_3$ powder" in Table 1.) and a known raw material powder for a first binder phase were prepared. The first binder phase powder, here prepared, was a $ZrO_2$ powder (average grain size 1 µm), an $Al_2O_3$—$ZrO_2$ solid solution powder (average grain size 1 µm), a $ZrB_2$ powder (average grain size 2 µm), a TiC powder (average grain size 1.2 µm), a TiN powder (average grain size 0.5 µm), a $Ti_2AlN$ powder (average grain size 0.4 µm), a $Ti_2AlC$ powder (average grain size 0.5 µm), a WC—Co powder (average grain size 2 µm), an Al powder (average grain size 2 µm), a NbN powder (average grain size 2 µm), a HfC powder (average grain size 2 µm), a $Mo_2N$ powder (average grain size 2 μm), a $Si_3N_4$ powder (average grain size 2 μm), or a VC powder (average grain size 2 μm).

The cBN powder, the aluminum oxide powder and the raw material powder for a first binder phase were prepared so that the compounding ratio (volume basis) shown in Table 1 was achieved. In Table 1, the designation "-" shows no use of the corresponding raw material powder. For example, in Sample 2, preparation was made at a compounding ratio of cBN powder (average grain size 2 μm, larger grain size): $Al_2O_3$ powder:$ZrO_2$ powder:Al powder=55.0:18.0:22.0:5.0.

TABLE 1

| | Compounding ratio (volume basis) | | | | |
|---|---|---|---|---|---|
| | cBN powder | | | | |
| | Larger | Smaller | | Raw material powder for first binder phase | |
| Sample No. | grain size | grain size | $Al_2O_3$ powder | Compound (volume ratio) | Volume ratio |
| 1 | 55.0 | — | 45.0 | — | — |
| 2 | 55.0 | — | 18.0 | $ZrO_2$(22.0), Al(5.0) | 27.0 |
| 3 | 55.0 | — | 18.0 | $ZrO_2$(22.0), Al(5.0) | 27.0 |
| 4 | 55.0 | — | 18.0 | $ZrO_2$(22.0), Al(5.0) | 27.0 |
| 5 | 55.0 | — | 18.0 | $ZrO_2$(22.0), Al(5.0) | 27.0 |
| 6 | 55.0 | — | 18.0 | $ZrO_2$(22.0), Al(5.0) | 27.0 |
| 7 | 55.0 | — | 18.0 | $ZrO_2$(22.0), Al(5.0) | 27.0 |
| 8 | 55.0 | — | 18.0 | $ZrO_2$(22.0), Al(5.0) | 27.0 |
| 9 | 55.0 | — | 18.0 | $ZrO_2$(22.0), Al(5.0) | 27.0 |
| 10 | 70.0 | — | 12.0 | $ZrO_2$(13.0), Al(5.0) | 18.0 |
| 11 | 40.0 | — | 24.0 | $ZrO_2$(31.0), Al(5.0) | 36.0 |
| 12 | 80.0 | — | 10.0 | $ZrO_2$(5.0), Al(5.0) | 10.0 |
| 13 | 30.0 | — | 28.0 | $ZrO_2$(37.0), Al(5.0) | 42.0 |
| 14 | 55.0 | — | 4.5 | $ZrO_2$(35.5), Al(5.0) | 40.5 |
| 15 | 55.0 | — | 18.0 | $Al_2O_3$—$ZrO_2$ Solid solution (22.0), Al(5.0) | 27.0 |
| 16 | 55.0 | — | 35.0 | $ZrB_2$(5.0), Al(5.0) | 10.0 |
| 17 | 55.0 | — | 30.0 | $Al_2O_3$—$ZrO_2$ Solid solution (5.0), Al(5.0), TiC(5.0) | 15.0 |
| 18 | 55.0 | — | 35.0 | TiC(5.0), Al(5.0) | 10.0 |
| 19 | 55.0 | — | 35.0 | TiN(5.0), Al(5.0) | 10.0 |
| 20 | 55.0 | — | 35.0 | $Ti_2AlN$(5.0), Al(5.0) | 10.0 |
| 21 | 55.0 | — | 30.0 | $Al_2O_3$—$ZrO_2$ Solid solution (5.0), $Ti_2AlC$(5.0), Al(5.0) | 15.0 |
| 22 | 55.0 | — | 35.0 | $Ti_2AlC$(5.0), Al(5.0) | 10.0 |
| 23 | 55.0 | — | 35.0 | WC—Co(5.0), Al(5.0) | 10.0 |
| 24 | 55.0 | — | 18.0 | $ZrO_2$(22.0), Al(5.0) | 27.0 |
| 25 | 55.0 | — | 18.0 | $ZrO_2$(22.0), Al(5.0) | 27.0 |
| 26 | 55.0 | — | 18.0 | $ZrO_2$(22.0), Al(5.0) | 27.0 |
| 27 | 55.0 | — | 18.0 | $ZrO_2$(22.0), Al(5.0) | 27.0 |
| 28 | 55.0 | — | 18.0 | $ZrO_2$(22.0), Al(5.0) | 27.0 |
| 29 | 55.0 | — | 18.0 | $ZrO_2$(22.0), Al(5.0) | 27.0 |
| 30 | 54.0 | 1.0 | 18.0 | $ZrO_2$(22.0), Al(5.0) | 27.0 |
| 31 | 52.0 | 3.0 | 18.0 | $ZrO_2$(22.0), Al(5.0) | 27.0 |
| 32 | 50.0 | 5.0 | 18.0 | $ZrO_2$(22.0), Al(5.0) | 27.0 |
| 33 | 45.0 | 10.0 | 18.0 | $ZrO_2$(22.0), Al(5.0) | 27.0 |
| 34 | 35.0 | 20.0 | 18.0 | $ZrO_2$(22.0), Al(5.0) | 27.0 |
| 35 | 45.0 | 10.0 | 18.0 | $ZrO_2$(22.0), Al(5.0) | 27.0 |
| 36 | 45.0 | 10.0 | 18.0 | $ZrO_2$(22.0), Al(5.0) | 27.0 |
| 37 | 45.0 | 10.0 | 18.0 | $ZrO_2$(22.0), Al(5.0) | 27.0 |
| 38 | 50.0 | 5.0 | 13.0 | $ZrO_2$(22.0), TiC(5.0), Al(5.0) | 32.0 |
| 39 | 50.0 | 5.0 | 13.0 | $ZrO_2$(22.0), $Ti_2AlN$(5.0), Al(5.0) | 32.0 |
| 40 | 50.0 | 5.0 | 13.0 | $ZrO_2$(22.0), $Ti_2AlC$(5.0), Al(5.0) | 32.0 |
| 41 | 55.0 | — | 18.0 | $ZrO_2$(22.0), Al(5.0) | 27.0 |
| 42 | 55.0 | — | 18.0 | $ZrO_2$(22.0), Al(5.0) | 27.0 |
| 43 | 55.0 | — | 18.0 | $ZrO_2$(22.0), Al(5.0) | 27.0 |
| 44 | 55.0 | — | 18.0 | $ZrO_2$(17.0), NbN(5.0), Al(5.0) | 27.0 |
| 45 | 55.0 | — | 18.0 | $ZrO_2$(17.0), HfC(5.0), Al(5.0) | 27.0 |
| 46 | 55.0 | — | 18.0 | $ZrO_2$(17.0), $Mo_2N$(5.0), Al(5.0) | 27.0 |
| 47 | 55.0 | — | 18.0 | $ZrO_2$(17.0), $Si_3N_4$(5.0), Al(5.0) | 27.0 |
| 48 | 55.0 | — | 18.0 | $ZrO_2$(17.0), VC(5.0), Al(5.0) | 27.0 |

<Mixing Step>

Next, the cBN powder and the aluminum oxide powder were mixed under conditions described in "Method", "Time" and "Medium" columns described in "Primary mixing" in Table 2, to obtain a primary powdery mixture (primary mixing). For example, in Sample 1, the mixing was made using an alumina medium having a diameter of 0.5 mm in a planetary stirring apparatus for 0.25 hours.

Next, the primary powdery mixture and the first binder phase powder were mixed under conditions described in "Method", "Time/Number of times", and "Medium" columns in "Secondary mixing" in Table 2, to obtain a secondary powdery mixture. For example, in Sample 1, a wet jet mill was used and the number of times was 30 passes. In Sample 9, the mixing was made using a cemented carbide medium having a diameter of 5 mm in a ball mill for 20 hours.

<Sintering Step>

The secondary powdery mixture was brought into contact with a WC-6% Co cemented carbide disc and a Co (cobalt) foil and thus introduced into a container made of Ta (tantalum), and the container was vacuumed and sealed. A belt-type ultrahigh-pressure and ultrahigh-temperature generator was used and the powdery mixture introduced into the container made of Ta was pressurized to a pressure of 6 GPa and then heated to a temperature described in "Temperature" column of "Sintering conditions" in Table 2, and held and sintered under pressure and temperature conditions after the pressurizing and heating, for a time described in "Time" column, to obtain a cubic boron nitride sintered material. For example, in Sample 1, a cubic boron nitride sintered material was obtained by holding and sintering at a pressure of 6 GPa and a temperature of 1350° C. for 0.25 hours.

TABLE 2

| Sample No. | Primary mixing | | | Secondary mixing | | | Sintering conditions | |
|---|---|---|---|---|---|---|---|---|
| | Method | Time (h) | Medium | Method | Time/Number of times | Medium | Temperature (° C.) | Time (h) |
| 1 | Planetary stirring | 0.25 | Alumina φ0.5 | Wet jet mill | 30 passes | None | 1350 | 0.25 |
| 2 | Planetary stirring | 0.25 | Alumina φ0.5 | Wet jet mill | 30 passes | None | 1350 | 0.25 |
| 3 | Planetary stirring | 2.00 | Alumina φ0.5 | Wet jet mill | 30 passes | None | 1350 | 0.25 |
| 4 | Planetary stirring | 1.00 | Alumina φ0.5 | Wet jet mill | 30 passes | None | 1350 | 0.25 |
| 5 | Planetary stirring | 0.03 | Alumina φ0.5 | Wet jet mill | 30 passes | None | 1350 | 0.25 |
| 6 | Planetary stirring | 0.25 | Alumina φ0.5 | Wet jet mill | 30 passes | None | 1450 | 0.25 |
| 7 | Planetary stirring | 0.25 | Alumina φ0.5 | Wet jet mill | 30 passes | None | 1600 | 0.25 |
| 8 | Planetary stirring | 0.25 | None | Wet jet mill | 30 passes | None | 1350 | 0.25 |
| 9 | Planetary stirring | 0.25 | Alumina φ0.5 | Ball mill | 20 hours | Cemented carbide φ5 | 1350 | 0.25 |
| 10 | Planetary stirring | 0.25 | Alumina φ0.5 | Wet jet mill | 30 passes | None | 1350 | 0.25 |
| 11 | Planetary stirring | 0.25 | Alumina φ0.5 | Wet jet mill | 30 passes | None | 1350 | 0.25 |
| 12 | Planetary stirring | 0.25 | Alumina φ0.5 | Wet jet mill | 30 passes | None | 1350 | 0.25 |
| 13 | Planetary stirring | 0.25 | Alumina φ0.5 | Wet jet mill | 30 passes | None | 1350 | 0.25 |
| 14 | Planetary stirring | 0.25 | Alumina φ0.5 | Wet jet mill | 30 passes | None | 1350 | 0.25 |
| 15 | Planetary stirring | 0.25 | Alumina φ0.5 | Wet jet mill | 30 passes | None | 1350 | 0.25 |
| 16 | Planetary stirring | 0.25 | Alumina φ0.5 | Wet jet mill | 30 passes | None | 1350 | 0.25 |
| 17 | Planetary stirring | 0.25 | Alumina φ0.5 | Wet jet mill | 30 passes | None | 1350 | 0.25 |
| 18 | Planetary stirring | 0.25 | Alumina φ0.5 | Wet jet mill | 30 passes | None | 1350 | 0.25 |
| 19 | Planetary stirring | 0.25 | Alumina φ0.5 | Wet jet mill | 30 passes | None | 1350 | 0.25 |
| 20 | Planetary stirring | 0.25 | Alumina φ0.5 | Wet jet mill | 30 passes | None | 1350 | 0.25 |
| 21 | Planetary stirring | 0.25 | Alumina φ0.5 | Wet jet mill | 30 passes | None | 1350 | 0.25 |
| 22 | Planetary stirring | 0.25 | Alumina φ0.5 | Wet jet mill | 30 passes | None | 1350 | 0.25 |
| 23 | Planetary stirring | 0.25 | Alumina φ0.5 | Wet jet mill | 30 passes | None | 1350 | 0.25 |
| 24 | Planetary stirring | 0.25 | Alumina φ0.3 | Wet jet mill | 30 passes | None | 1350 | 0.5 |
| 25 | Planetary stirring | 0.25 | Alumina φ0.3 | Wet jet mill | 30 passes | None | 1350 | 0.25 |
| 26 | Planetary stirring | 0.25 | Alumina φ0.3 | Wet jet mil | 30 passes | None | 1350 | 0.15 |

TABLE 2-continued

| | Primary mixing | | | Secondary mixing | | Sintering conditions | |
|---|---|---|---|---|---|---|---|
| Sample No. | Method | Time (h) | Medium | Method | Time/Number of times | Medium | Temperature (° C.) | Time (h) |
| 27 | Planetary stirring | 0.25 | Alumina φ0.3 | Wet jet mill | 30 passes | None | 1350 | 0.1 |
| 28 | Planetary stirring | 0.25 | Alumina φ0.3 | Wet jet mill | 30 passes | None | 1250 | 0.1 |
| 29 | Planetary stirring | 0.25 | Alumina φ0.3 | Wet jet mill | 30 passes | None | 1350 | 0.25 |
| 30 | Planetary stirring | 0.25 | Alumina φ0.3 | Wet jet mill | 30 passes | None | 1350 | 0.25 |
| 31 | Planetary stirring | 0.25 | Alumina φ0.3 | Wet jet mill | 30 passes | None | 1350 | 0.25 |
| 32 | Planetary stirring | 0.25 | Alumina φ0.3 | Wet jet mill | 30 passes | None | 1350 | 0.25 |
| 33 | Planetary stirring | 0.25 | Alumina φ0.3 | Wet jet mill | 30 passes | None | 1350 | 0.25 |
| 34 | Planetary stirring | 0.25 | Alumina φ0.3 | Wet jet mill | 30 passes | None | 1350 | 0.25 |
| 35 | Planetary stirring | 0.10 | Alumina φ0.3 | Wet jet mill | 30 passes | None | 1350 | 0.25 |
| 36 | Planetary stirring | 1.00 | Alumina φ0.3 | Wet jet mill | 30 passes | None | 1350 | 0.25 |
| 37 | Planetary stirring | 1.00 | Alumina φ0.1 | Wet jet mill | 30 passes | None | 1350 | 0.25 |
| 38 | Planetary stirring | 0.25 | Alumina φ0.3 | Wet jet mill | 30 passes | None | 1350 | 0.25 |
| 39 | Planetary stirring | 0.25 | Alumina φ0.3 | Wet jet mill | 30 passes | None | 1350 | 0.25 |
| 40 | Planetary stirring | 0.25 | Alumina φ0.3 | Wet jet mill | 30 passes | None | 1350 | 0.25 |
| 41 | Planetary stirring | 0.25 | Alumina φ0.3 | Wet jet mill | 30 passes | None | 1350 | 0.25 |
| 42 | Planetary stirring | 0.25 | Alumina φ0.1 | Wet jet mill | 30 passes | None | 1350 | 0.25 |
| 43 | Planetary stirring | 0.25 | Alumina φ2.0 | Wet jet mill | 30 passes | None | 1350 | 0.25 |
| 44 | Planetary stirring | 0.25 | Alumina φ0.5 | Wet jet mill | 30 passes | None | 1350 | 0.25 |
| 45 | Planetary stirring | 0.25 | Alumina φ0.5 | Wet jet mill | 30 passes | None | 1350 | 0.25 |
| 46 | Planetary stirring | 0.25 | Alumina φ0.5 | Wet jet mill | 30 passes | None | 1350 | 0.25 |
| 47 | Planetary stirring | 0.25 | Alumina φ0.5 | Wet jet mill | 30 passes | None | 1350 | 0.25 |
| 48 | Planetary stirring | 0.25 | Alumina φ0.5 | Wet jet mill | 30 passes | None | 1350 | 0.25 |

<Evaluation>

<<Content (% by Volume) of Cubic Boron Nitride Grains, Content (% by Volume) of Binder Phase, Content (% by Volume) of First Voids and Content (% by Volume) of Second Void>>

Each of the cubic boron nitride sintered materials was subjected to measurement of the content (% by volume) of the cubic boron nitride grains, the content (% by volume) of the binder phase, the content (% by volume) of the first voids and the content (% by volume) of the second void. Specific measurement methods are shown in Embodiment 1, and thus the descriptions thereof are not repeated. The content (% by volume) of the first voids and the content (% by volume) of the second void are shown in the "First void content" and "Second void content" column in Table 3 and Table 4. It was confirmed that the cubic boron nitride sintered materials of all Samples were each composed of cubic boron nitride grains, a binder phase and a void.

In other words, the total content (% by volume) of the cubic boron nitride grains and the binder phase in the cubic boron nitride sintered material was determined by subtracting the content (% by volume) of the first voids and the content (% by volume) of the second void from the entire of the cubic boron nitride sintered material (100% by volume). It was confirmed that the volume ratio between the cubic boron nitride grains and the binder phase in each of the cubic boron nitride sintered materials of all Samples maintained the compounding ratio between the cBN powder as a raw material (when two kinds were used, the total thereof was adopted) and the raw material powder for the binder phase (the total of the aluminum oxide powder and the raw material powder for a first binder phase).

<<Composition of Binder Phase>>

Each of the cubic boron nitride sintered materials was subjected to measurement of the composition of the binder phase and the content (% by volume) of the aluminum oxide grains based on the entire binder phase. Specific measurement methods are shown in Embodiment 1, and thus the descriptions thereof are not repeated. It was confirmed that the binder phase in Sample 1 was composed of 100% by volume of the aluminum oxide grains. It was confirmed that the binder phases in other Samples were each composed of the aluminum oxide grains and the first binder phase. In other words, the total of the aluminum oxide grains and the first binder phase grains in the binder phase was 100% by volume. The composition of the first binder phase in each of Samples is shown in each "Composition of first binder phase" column in Table 3 and Table 4. The content (% by volume) of the aluminum oxide grains based on the entire binder phase is shown in each "Al$_2$O$_3$/binder phase" column in Table 3 and Table 4.

In all Samples, the value obtained by subtracting the content (% by volume) of the aluminum oxide grains based on the entire binder phase from the entire binder phase (100% by volume) corresponded to the content of the first binder phase grains in the binder phase.

<<Average Grain Size of Aluminum Oxide Grains>>

Each of the cubic boron nitride sintered materials was subjected to measurement of the average grain size of the aluminum oxide grains (the arithmetic average diameter on a number basis with respect to the equivalent circular diameter). Specific measurement methods are shown in Embodiment 1, and thus the descriptions thereof are not repeated. The results are shown in each "Al$_2$O$_3$ average grain size" column in Table 3 and Table 4.

<<Distance between First Voids>>

The cubic boron nitride sintered material in each of Samples was subjected to measurement of the average distance between the first voids. Specific measurement methods are shown in Embodiment 1, and thus the descriptions thereof are not repeated. The results are shown in each "Distance between first voids" column in Table 3 and Table 4.

<<Cross-Sectional Area of First Void>>

The cubic boron nitride sintered material in each of Samples was subjected to measurement of the average of the cross-sectional areas of the first voids. Specific measurement methods are shown in Embodiment 1, and thus the descriptions thereof are not repeated. The results are shown in each "Cross-sectional area of first void" column in Table 3 and Table 4.

<<First Cubic Boron Nitride Grains>>

The cubic boron nitride sintered material in each of Samples was subjected to identification of any first cubic boron nitride grain having a grain size of 5% or more and 50% or less of the average grain size of the aluminum oxide grains, and the percentage on a volume basis of the first cubic boron nitride grains relative to the binder phase was measured. Specific measurement methods are shown in Embodiment 1, and thus the descriptions thereof are not repeated. The results are shown in each "First cBN/Binder phase" in Table 3 and Table 4.

The cubic boron nitride sintered material in each of Samples was subjected to measurement of the content on a number basis of the first A cubic boron nitride grains of the first cubic boron nitride grains. Specific measurement methods are shown in Embodiment 1, and thus the descriptions thereof are not repeated. The results are shown in each "First A-cBN/First cBN" column in Table 3 and Table 4. It is indicated that any Sample, where "-" is described in the "First A-cBN/First cBN" column, is free of first cubic boron nitride grains and thus is not subjected to measurement of the present section.

<Cutting Test>

The cBN sintered material of each of Sample 1 to Sample 48 was used to produce a cutting tool (shape: TCGW110208). The tool was subjected to a cutting test with a machining center under the following cutting conditions. The following cutting conditions correspond to high-efficiency and high-load cutting of cast iron.

Workpiece: centrifugally cast iron
Cutting speed Vc: 1000 m/min
Feed rate f: 0.35 mm/rev
Cutting depth Ap: 0.2 mm
Coolant: WET
Cutting method: cutting which allows for the occurrence of collision between tool and workpiece 50 times for complete cutting with 50 bites/0.8 km and a cutting length of 0.8 km at a certain cut
Evaluation method: a cutting distance (km) until breakage is derived. It is indicated that, as the cutting distance is longer, the tool life is longer.

The results are shown in each "Life" column in Table 3 and Table 4.

TABLE 3

| | Cubic boron nitride sintered material | | | | | |
|---|---|---|---|---|---|---|
| Sample No. | Average grain size of Al$_2$O$_3$ (nm) | First void content (% by volume) | Second void content (% by volume) | Distance between first voids (μm) | Cross-sectional area of first void (μm$^2$) | Al$_2$O$_3$/Binder phase (% by volume) |
| 1 | 162 | 0.076 | 0 | 0.83 | 0.0005 | 100.0 |
| 2 | 102 | 0.051 | 0.001 | 0.88 | 0.0008 | 45.5 |
| 3 | 48 | 0.035 | 0 | 0.80 | 0.0005 | 50.2 |
| 4 | 50 | 0.003 | 0 | 0.85 | 0.0002 | 47.7 |
| 5 | 112 | 0.092 | 0.002 | 0.57 | 0.0005 | 50.8 |
| 6 | 250 | 0.008 | 0 | 0.80 | 0.0005 | 46.3 |
| 7 | 323 | 0.002 | 0 | 0.72 | 0.0001 | 40.3 |
| 8 | 123 | 0.150 | 0 | 0.92 | 0.0040 | 42.3 |
| 9 | 83 | 0.000 | 0 | 0 | 0 | 46.3 |
| 10 | 100 | 0.074 | 0.001 | 0.83 | 0.0007 | 42.0 |
| 11 | 90 | 0.010 | 0 | 0.48 | 0.0009 | 44.1 |
| 12 | 98 | 0.130 | 0.002 | 0.81 | 0.0018 | 52.9 |
| 13 | 119 | 0.000 | 0 | 0 | 0 | 43.6 |
| 14 | 120 | 0.006 | 0 | 0.77 | 0.0050 | 11.0 |
| 15 | 120 | 0.047 | 0 | 0.75 | 0.0006 | 45.2 |
| 16 | 98 | 0.060 | 0.002 | 0.80 | 0.0008 | 81.8 |
| 17 | 111 | 0.038 | 0 | 0.40 | 0.0005 | 69.3 |
| 18 | 106 | 0.033 | 0 | 0.59 | 0.0003 | 79.1 |
| 19 | 103 | 0.071 | 0 | 0.61 | 0.0005 | 80.2 |
| 20 | 112 | 0.038 | 0 | 0.78 | 0.0009 | 81.7 |
| 21 | 127 | 0.018 | 0 | 0.92 | 0.0006 | 70.3 |
| 22 | 92 | 0.033 | 0 | 0.54 | 0.0003 | 80.8 |
| 23 | 120 | 0.012 | 0.001 | 0.94 | 0.0002 | 81.0 |

TABLE 3-continued

| | | | | | | |
|---|---|---|---|---|---|---|
| 24 | 88 | 0.031 | 0.002 | 1.30 | 0.0006 | 43.4 |
| 25 | 92 | 0.044 | 0.001 | 2.10 | 0.0014 | 42.1 |
| 26 | 99 | 0.051 | 0.001 | 1.80 | 0.0050 | 43.0 |
| 27 | 104 | 0.066 | 0 | 3.50 | 0.0160 | 43.5 |
| 28 | 93 | 0.088 | 0 | 2.50 | 0.0240 | 40.9 |

| | Cubic boron nitride sintered material | | | | | |
|---|---|---|---|---|---|---|
| Sample No. | Composition of first binder phase | First cBN/Binder phase (% by volume) | First A-cBN/First cBN (% by number) | Grain size of first cBN (nm) | cBN/Alumina (Grain size) | Life (km) |
| 1 | — | 0 | — | — | — | 0.30 |
| 2 | $ZrO_2$, ZrN, $ZrB_2$ | 0 | — | — | — | 0.43 |
| 3 | $ZrO_2$, ZrN, $ZrB_2$ | 0 | — | — | — | 0.16 |
| 4 | $ZrO_2$, ZrN, $ZrB_2$ | 0 | — | — | — | 0.34 |
| 5 | $ZrO_2$, ZrN, $ZrB_2$ | 0 | — | — | — | 0.34 |
| 6 | $ZrO_2$, ZrN, $ZrB_2$ | 0 | — | — | — | 0.34 |
| 7 | $ZrO_2$, ZrN, $ZrB_2$ | 0 | — | — | — | 0.16 |
| 8 | $ZrO_2$, ZrN, $ZrB_2$ | 0 | — | — | — | 0.25 |
| 9 | $ZrO_2$, ZrN, $ZrB_2$ | 0 | — | — | — | 0.16 |
| 10 | $ZrO_2$, ZrN, $ZrB_2$ | 0 | — | — | — | 0.34 |
| 11 | $ZrO_2$, ZrN, $ZrB_2$ | 0 | — | — | — | 0.34 |
| 12 | $ZrO_2$, ZrN, $ZrB_2$ | 0 | — | — | — | 0.16 |
| 13 | $ZrO_2$, ZrN, $ZrB_2$ | 0 | — | — | — | 0.16 |
| 14 | $ZrO_2$, ZrN, $ZrB_2$ | 0 | — | — | — | 0.34 |
| 15 | $ZrO_2$, ZrN, $ZrB_2$ | 0 | — | — | — | 0.43 |
| 16 | $ZrB_2$, AlN | 0 | — | — | — | 0.43 |
| 17 | $ZrO_2$, ZrN, $ZrB_2$, TiC | 0 | — | — | — | 0.52 |
| 18 | $TiB_2$, TiC, AlN | 0 | — | — | — | 0.52 |
| 19 | $TiB_2$, TiN | 0 | — | — | — | 0.43 |
| 20 | $TiB_2$, TiN | 0 | — | — | — | 0.52 |
| 21 | $ZrO_2$, ZrN, $ZrB_2$, TiC | 0 | — | — | — | 0.52 |
| 22 | $TiB_2$, TiC, AlN | 0 | — | — | — | 0.52 |
| 23 | WC, $W_2Co_{21}B_6$, AlN | 0 | — | — | — | 0.52 |
| 24 | $ZrO_2$, ZrN, $ZrB_2$ | 0 | — | — | — | 0.52 |
| 25 | $ZrO_2$, ZrN, $ZrB_2$ | 0 | — | — | — | 0.60 |
| 26 | $ZrO_2$, ZrN, $ZrB_2$ | 0 | — | — | — | 0.60 |
| 27 | $ZrO_2$, ZrN, $ZrB_2$ | 0 | — | — | — | 0.60 |
| 28 | $ZrO_2$, ZrN, $ZrB_2$ | 0 | — | — | — | 0.52 |

TABLE 4

| | Cubic boron nitride sintered material | | | | | |
|---|---|---|---|---|---|---|
| Sample No. | Average grain size of $Al_2O_3$ (nm) | First void content (% by volume) | Second void content (% by volume) | Distance between first voids (μm) | Cross-sectional area of first void (μm$^2$) | $Al_2O_3$/Binder phase (% by volume) |
| 29 | 92 | 0.044 | 0 | 2.10 | 0.0014 | 42.2 |
| 30 | 106 | 0.039 | 0 | 3.00 | 0.0020 | 43.1 |
| 31 | 99 | 0.048 | 0 | 2.70 | 0.0050 | 41.9 |
| 32 | 108 | 0.052 | 0.002 | 1.50 | 0.0028 | 42.6 |
| 33 | 91 | 0.031 | 0.002 | 1.40 | 0.0035 | 39.9 |
| 34 | 88 | 0.033 | 0 | 2.40 | 0.0018 | 44.3 |
| 35 | 120 | 0.020 | 0.001 | 3.20 | 0.0030 | 41.7 |
| 36 | 70 | 0.024 | 0.002 | 3.30 | 0.0025 | 41.9 |
| 37 | 150 | 0.015 | 0 | 2.20 | 0.0060 | 43.3 |
| 38 | 88 | 0.022 | 0 | 1.60 | 0.0040 | 31.3 |
| 39 | 141 | 0.042 | 0 | 4.10 | 0.0036 | 33.2 |
| 40 | 130 | 0.027 | 0.001 | 2.10 | 0.0020 | 33.3 |
| 41 | 88 | 0.031 | 0.001 | 1.30 | 0.0006 | 42.0 |
| 42 | 75 | 0.025 | 0 | 4.30 | 0.0003 | 44.7 |
| 43 | 181 | 0.020 | 0 | 19.00 | 0.0003 | 42.5 |
| 44 | 84 | 0.054 | 0 | 0.80 | 0.0005 | 42.1 |
| 45 | 102 | 0.022 | 0.001 | 0.81 | 0.0008 | 41.8 |
| 46 | 97 | 0.038 | 0 | 0.53 | 0.0009 | 40.8 |
| 47 | 115 | 0.046 | 0 | 0.60 | 0.0005 | 43.2 |
| 48 | 120 | 0.071 | 0.001 | 0.87 | 0.0005 | 41.0 |

TABLE 4-continued

| | | Cubic boron nitride sintered material | | | | |
|---|---|---|---|---|---|---|
| Sample No. | Composition of first binder phase | First cBN/ Binder phase (% by volume) | First A-cBN/ First cBN (% by number) | Grain size of first cBN (nm) | cBN/ Alumina (Grain size) | Life (km) |
| 29 | ZrO$_2$, ZrN, ZrB$_2$ | 0 | — | — | — | 0.60 |
| 30 | ZrO$_2$, ZrN, ZrB$_2$ | 1.0 | 94 | 32 | 0.3 | 0.60 |
| 31 | ZrO$_2$, ZrN, ZrB$_2$ | 3.0 | 97 | 38 | 0.38 | 0.78 |
| 32 | ZrO$_2$, ZrN, ZrB$_2$ | 5.0 | 92 | 50 | 0.46 | 0.78 |
| 33 | ZrO$_2$, ZrN, ZrB$_2$ | 9.9 | 58 | 29 | 0.32 | 0.69 |
| 34 | ZrO$_2$, ZrN, ZrB$_2$ | 19.8 | 19 | 37 | 0.42 | 0.43 |
| 35 | ZrO$_2$, ZrN, ZrB$_2$ | 9.9 | 5 | 38 | 0.32 | 0.52 |
| 36 | ZrO$_2$, ZrN, ZrB$_2$ | 9.9 | 95 | 37 | 0.53 | 0.43 |
| 37 | ZrO$_2$, ZrN, ZrB$_2$ | 9.9 | 97 | 7 | 0.05 | 0.43 |
| 38 | TiB$_2$, TiC, AlN | 5.0 | 91 | 31 | 0.35 | 0.69 |
| 39 | TiB$_2$, TiN | 5.0 | 97 | 34 | 0.24 | 0.78 |
| 40 | TIB$_2$, TiC, AlN | 5.0 | 93 | 27 | 0.21 | 0.78 |
| 41 | ZrO$_2$, ZrN, ZrB$_2$ | 0 | — | — | — | 0.52 |
| 42 | ZrO$_2$, ZrN, ZrB$_2$ | 0 | — | — | — | 0.52 |
| 43 | ZrO$_2$, ZrN, ZrB$_2$ | 0 | — | — | — | 0.52 |
| 44 | ZrO$_2$, NbN, ZrN, ZrB$_2$ | 0 | — | — | — | 0.43 |
| 45 | ZrO$_2$, HfC, ZrN, ZrB$_2$ | 0 | — | — | — | 0.43 |
| 46 | ZrO$_2$, Mo$_2$N, ZrN, ZrB$_2$ | 0 | — | — | — | 0.43 |
| 47 | ZrO$_2$, Si$_3$N$_4$, ZrN, ZrB$_2$ | 0 | — | — | — | 0.34 |
| 48 | ZrO$_2$, VC, ZrN, ZrB$_2$ | 0 | — | — | — | 0.43 |

<Discussion>

The cubic boron nitride sintered materials of Sample 1, Sample 2, Sample 4 to Sample 6, Sample 10, Sample 11, and Sample 14 to Sample 48 correspond to Examples.

The cubic boron nitride sintered material of Sample 3, having an average grain size of the aluminum oxide grains of less than 50 nm, corresponds to Comparative Example.

The cubic boron nitride sintered material of Sample 7, having an average grain size of the aluminum oxide grains of more than 250 nm, corresponds to Comparative Example.

The cubic boron nitride sintered material of Sample 8, having a content of the first voids of more than 0.10% by volume, corresponds to Comparative Example.

The cubic boron nitride sintered material of Sample 9, having a content of the first voids of less than 0.001% by volume, corresponds to Comparative Example.

The cubic boron nitride sintered material of Sample 12, having a percentage on a volume basis of the cubic boron nitride grains based on the total of the cubic boron nitride grains and the binder phase, of more than 70% by volume, and a content of the first voids of more than 0.10% by volume, corresponds to Comparative Example.

The cubic boron nitride sintered material of Sample 13, having a content of the cubic boron nitride grains based on the total of the cubic boron nitride grains and the binder phase, of less than 39% by volume, and a content of the first voids of less than 0.001% by volume, corresponds to Comparative Example.

It was confirmed that the cubic boron nitride sintered materials of Sample 1, Sample 2, Sample 4 to Sample 6, Sample 10, Sample 11, and Sample 14 to Sample 48 (Examples) each had a longer tool life than the cubic boron nitride sintered materials of Sample 3, Sample 7 to Sample 9, Sample 12 and Sample 13 (Comparative Examples). The reason for this is presumed as follows: Samples corresponding to Examples are more excellent in breakage resistance even in high-efficiency and high-load cutting of cast iron.

While embodiments and Examples of the present disclosure are described as above, configurations of the above embodiments and Examples are expected from the beginning to be appropriately combined and/or variously modified.

The embodiments and Examples here disclosed are illustrative in every respect and should be considered not to be limited. The scope of the present invention is indicated by not the above embodiments and Examples, but claims, and is intended to encompass the meanings equivalent to the claims and all modifications falling within the scope.

REFERENCE SIGNS LIST

1 void, 2 cubic boron nitride grain, 3 binder phase, 4 cubic boron nitride sintered material, 5 aluminum oxide grain, 6 first binder phase grain

The invention claimed is:

1. A cubic boron nitride sintered material comprising cubic boron nitride grains, a binder phase, and one or more first voids, wherein
 a percentage on a volume basis of the cubic boron nitride grains based on the total of the cubic boron nitride grains and the binder phase is 40% by volume or more and 70% by volume or less,
 a percentage on a volume basis of the binder phase based on the total of the cubic boron nitride grains and the binder phase is 30% by volume or more and 60% by volume or less,
 the binder phase includes 10% by volume or more and 100% by volume or less of aluminum oxide grains based on the entire binder phase,
 an average grain size of the aluminum oxide grains is 50 nm or more and 250 nm or less,
 the cubic boron nitride sintered material comprises 0.001% by volume or more and 0.100% by volume or less of the one or more first voids, and
 at least one portion of each of the one or more first voids is in contact with the aluminum oxide grains.

2. The cubic boron nitride sintered material according to claim 1, wherein
 the binder phase is composed of 10% by volume or more and 98% by volume or less of the aluminum oxide grains and 2% by volume or more and 90% by volume or less of first binder phase grains, the first binder phase grains include one of or both
- at least one selected from a second group consisting of a material made of a single element selected from a first group consisting of a group 4 element, a group 5 element and a group 6 element of the periodic table, aluminum, silicon, iron, cobalt and nickel, and an alloy and an intermetallic compound each composed of two or more elements selected from the first group, and
- at least one selected from a fourth group consisting of a first compound composed of at least one element selected from the first group and at least one element selected from a third group consisting of nitrogen, carbon, boron and oxygen, and a solid solution of the first compound, and the first compound is free of aluminum oxide grains.

3. The cubic boron nitride sintered material according to claim 1, wherein
- the one or more first voids of the cubic boron nitride sintered material includes a plurality of the first voids, and
- an average distance between the first voids is 1.0 μm or more and 20 μm or less.

4. The cubic boron nitride sintered material according to claim 1, wherein
- the one or more first voids of the cubic boron nitride sintered material includes a plurality of the first voids, and
- an average of cross-sectional areas of the first voids is 0.001 μm$^2$ or more and 0.02 μm$^2$ or less.

5. The cubic boron nitride sintered material according to claim 1, wherein
- the cubic boron nitride grains include first cubic boron nitride grains,
- grain sizes of the first cubic boron nitride grains are each 5% or more and 50% or less of the average grain size of the aluminum oxide grains,
- a percentage on a volume basis of the first cubic boron nitride grains relative to the binder phase is 1% or more and 30% or less,
- the first cubic boron nitride grains include 30% or more and 100% or less of first A cubic boron nitride grains on a number basis, and
- at least one portion of each of the first A cubic boron nitride grains is in contact with the aluminum oxide grains.

* * * * *